Oct. 25, 1927.
T. G. SCHMEISER
1,646,600
TRACTOR HITCH
Filed Sept. 12, 1923
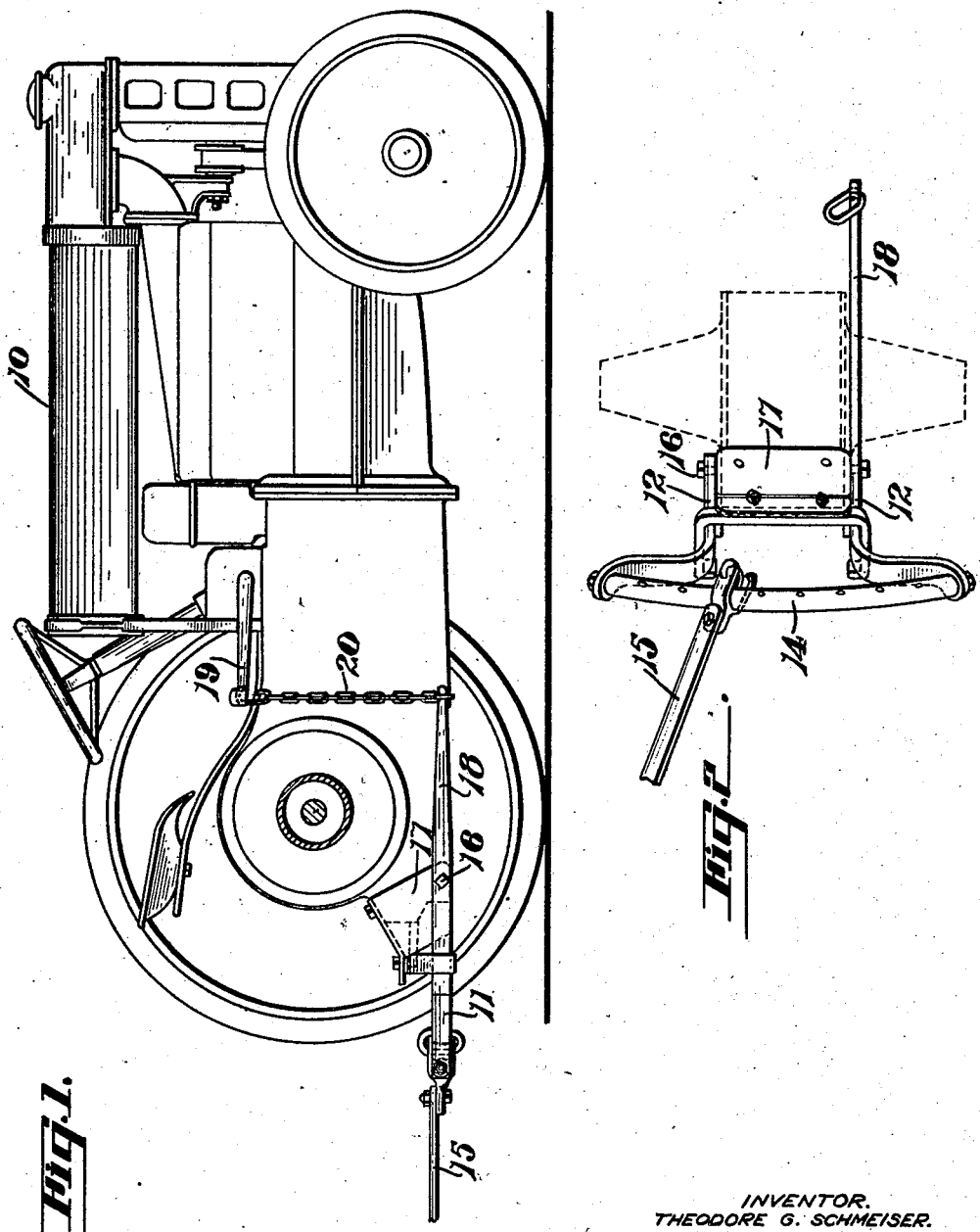
INVENTOR.
THEODORE G. SCHMEISER.
BY Dewey Strong,
Townsend & Loftus
ATTORNEYS Patented Oct. 25, 1927.

1,646,600

UNITED STATES PATENT OFFICE.

THEODORE G. SCHMEISER, OF DAVIS, CALIFORNIA, ASSIGNOR TO JOHN H. HERRING, OF PIEDMONT, CALIFORNIA.

TRACTOR HITCH.

Application filed September 12, 1923. Serial No. 662,209.

This invention relates to tractors. When too great a load is imposed upon small four-wheel tractors particularly those of the Fordson type, or when the implement drawn by the tractor engages an unyielding obstruction, the driving mechanism of the machine causes the front end of the tractor to suddenly swing upwardly about the rear axle. This is often injurious to the driver and damages the tractor.

It is the object of the present invention to prevent this upward swinging of the tractor by providing a connection between the draw bar hitch of the tractor and the clutch thereof, whereby the clutch will be automatically disengaged when the front end of the tractor commences to rise and swing about the rear axle.

One form which the invention may assume is exemplified in the following description and illustrated in the accompanying drawings, in which:—

Fig. 1 is a side elevation of the four wheel tractor disclosing my invention applied thereto.

Fig. 2 is a plan view of the same.

Referring more particularly to the accompanying drawings, 10 indicates a standard form of a small four wheel tractor. This tractor is provided with a draw bar hitch 11 which is connected to the rear of the tractor just below the transmission housing. This hitch comprises a pair of pivotal longitudinal members 12 and an arcuate bar 14 connected to the rear ends thereof. A draw bar connection 15 is connected to this arcuate bar whereby an implement may be hitched to the tractor. The longitudinal members 12 are pivotally connected as at 16 to a member 17 which is rigidly connected to the tractor frame. One of the longitudinal members is formed with an extension 18 which extends forwardly to a point just below the clutch pedal 19 of the tractor. A chain connection 20 is provided. This connection connects the forward end of the extension 18 to the clutch pedal.

When the tractor is in operation drawing an implement, should the latter meet with an unyielding obstruction and prevent forward movement of the tractor, the front end of the latter will tend to rise. When this occurs, the chain connection 18 will be placed in tension and will hold the front end of the clutch pedal stationary so that a small amount of upward swinging movement of the front end of the tractor will cause disengagement of the clutch. The engine of the tractor will then be disconnected from the transmission thereof and consequently further rising of the front end of the tractor will be prevented. By taking up links in the chain 20 or adding other links thereto, the point in the tilting movement of the tractor where the clutch will be thrown out may be varied; that is to say, by shortening up on the chain the clutch will be thrown out early in the tilting movement of the front end of the tractor, whereas by providing slack in the chain, the tractor may reach a higher point in its tilting movement before the clutch will be thrown out. In this way provision can be made for crossing rough and uneven ground without danger of throwing out the clutch.

From the foregoing, it is obvious that very simple means have been provided which will operate automatically to prevent small tractors from swinging upwardly unduly about their rear axle when in operation.

Having thus described my invention as now known to me, I wish it understood that various changes may be made in its construction without departing from the spirit of the invention as defined in the appended claim.

Having thus described my invention, what I claim and desire to secure by Letters Patent is:—

In combination with a tractor, of a yoke connected with the transmission housing of the tractor at the bottom and the rear thereof, said yoke having downwardly depending portions, a pair of longitudinal members pivoted to said portions for vertical swinging movement, the rear ends of said longitudinal members being bent outwardly and rearwardly, an arcuate bar extending between said rear ends of said longitudinal members, a draw bar connection slidably engaged with said arcuate bar for hitching the tractor to an implement to be drawn, a bail-shaped member secured to said yoke at the rear thereof and extending downwardly, the sides of the bail terminating in hooks engageable with said longitudinal member to limit the downward movement of the rear ends of the latter, one of said longitudinal members being formed with a forwardly extending extension, and a flexible connection between the terminating end of said extension and the clutch pedal of the tractor whereby upward swinging movement of the front end of the tractor about the rear axle thereof will be accompanied by disengagement of the clutch.

THEODORE G. SCHMEISER.